Patented Nov. 2, 1937

2,097,904

UNITED STATES PATENT OFFICE 2,097,904

PRODUCTION OF MALEIC ACID

Clyde H. Walters, South Charleston, W. Va., assignor, by mesne assignments, to Union Carbide and Carbon Corporation, a corporation of New York No Drawing. Application April 9, 1935,
Serial No. 15,398

10 Claims. (Cl. 260—116)

The invention relates to the production of maleic acid, having particular relation to a new and improved process for preparing this acid. The process consists essentially of a vapor phase oxidation of hydrocarbons which are more readily available, and less expensive, than materials heretofore commonly employed in the production of this acid.

I have found that butylene (including both 1-butene and 2-butene), butadiene, and the normal and secondary butyl alcohols (that is, substances from which butylenes are readily generated) may all be oxidized, in the presence of a suitable catalyst, and under properly controlled reaction conditions, to give very good yields of maleic acid. With a catalyst containing vanadium, and air as an oxidizing medium, a production greater than 25% of that theoretically possible has been readily obtained.

The reaction is conducted entirely in the vapor phase, and in mixture with an excess of air, which may be enriched with further oxygen, or diluted with nitrogen or other inert gas, to obtain the particular oxygen concentration desired. Aside from the nature of the catalyst material, factors especially essential to an efficient conversion, are the temperature, and the period of heating of the vapor in contact with the catalyst. Very satisfactory yields, from both butylene and butadiene, have been obtained at temperatures varying from about 250° C. to 400° C., the reaction time being increased at the lower temperatures. With butyl alcohol as the starting material, a temperature of about 300° C. to 310° C. appears to be most suitable.

An especially effective catalyst for this reaction consists of tin vanadate in mixture with molybdenum oxide and titanium oxide. Oxalic acid is also used in preparing the catalyst, but this serves primarily as a binder, since it is quite completely removed at the temperature employed in the process. The active catalyst is preferably supported on a granular inert carrier of an artificial silica filter stone of a fineness of about 4 to 8 mesh. One hundred cubic centimeters of a typical mixture for preparing the catalyst will contain 3.6 grams of tin vanadate (Sn(VO$_3$)$_4$), 20 grams of molybdenum oxide, 10 grams of titanium oxide, 10 grams of oxalic acid, 100 c. c. of an inert carrier, and 100 c. c. of water. This mixture is evaporated to dryness with stirring, and may then be finally ignited in the catalyst tube in a stream of air at a temperature of about 350° C., prior to initiating the oxidation reaction.

A large number of experiments have been conducted to determine the most favorable reaction conditions, among which the following examples are representative of the process.

Example 1

Pure normal butylene consisting chiefly of 1-butene and another sample consisting chiefly of 2-butene were prepared by respective dehydration of normal butyl alcohol and secondary butyl alcohol over activated alumina at a temperature of 350° C. Both materials were oxidized under identical conditions, which consisted in introducing to the reaction chamber 4.5 to 5.0 grams of the material per hour, combined with an air stream of 200 liters per hour. This mixture was passed over 200 c. c. of catalyst, of the type above described, heated and maintained at a temperature of about 350° C. The maleic acid in the vapor leaving the converter was obtained by cooling and scrubbing with water. The yields of total acid, calculated as maleic anhydride, were 24% of the theoretical value with 1-butene as a starting material, and 23% with 2-butene.

Example 2

A material containing, in addition to certain amounts of all the butylenes, butadiene and butane, was also oxidized to maleic acid. With this material, the feed to the reaction tube was 4.5 grams per hour in an air stream of 200 liters per hour, containing additional nitrogen to an amount sufficient to give an oxygen content in the air mixture of 18%. The temperature was maintained at 350° C. and 200 c. c. of catalyst was used. A yield of maleic acid of 19% was obtained, being lower than the above run, probably due to the crude nature of the starting product.

Example 3

Pure butadiene in an amount of 3 grams per hour, mixed with an air stream of 200 liters per hour, was effectively converted to maleic acid. Here also 200 c. c. of catalyst was used, and a temperature of 350° C. The total yield of maleic acid was 28% of the theoretical value.

Example 4

Butyl alcohols, both 1-butanol and 2-butanol, were vaporized by diffusing nitrogen into the alcohol in a feed tank at the rate of 30 to 36 liters per hour. This vapor combined with 400 liters per hour of air was passed into the reaction chamber, giving a feed of 2.5 grams of alcohol per hour. 100 c. c. of catalyst was used, and the temperature maintained at 300° to 310° C. The maleic acid was recovered as previously described, and the yields, based on the total acidity of the product, were 31% for a starting material of 1-butanol, and 30% with the 2-butanol.

Variations in the conditions shown by the above examples, especially as to temperature, are possible, while still maintaining a yield of acid as good, or better, than those indicated. Within a temperature range of 250° C. to 400° C., efficient yields of maleic acid have been obtained, but with decrease in temperature, it is desirable to increase the contact time of the vapors with the catalyst material. The most suitable relation between contact time and temperature may be determined by test, and a normal air composition is satisfactory as the oxidizing medium. The catalyst described is preferred for this reaction, although modification in the specific composition given may also be found appropriate. It will be understood that the invention should not be limited other than as defined in the appended claims.

I claim:

1. The process for preparing maleic acid which comprises contacting the vapors of a free oxygen-containing gas in excess of that necessary for complete combustion and a member of the group consisting of butylene, butadiene, and substances from which butylenes are readily generated, with an oxidation catalyst containing as essential constituents tin vanadate, molybdenum oxide and titanium oxide, at a temperature of about 250° C. to about 400° C., and recovering the maleic acid from the reaction product.

2. The process for preparing maleic acid which comprises contacting a vapor mixture of air in excess of that necessary for complete combustion and a member of the group consisting of butylene, butadiene, and substances from which butylenes are readily generated, with an oxidation catalyst containing vanadium, at a temperature sufficient to form maleic acid, and recovering the maleic acid from the reaction product.

3. The process for preparing maleic acid which comprises contacting a vapor mixture of air in excess of that necessary for complete combustion and a member of the group consisting of butylene, butadiene, and substances from which butylenes are readily generated, with an oxidation catalyst containing tin vanadate and molybdenum oxide, at a temperature of about 250° C. to about 400° C., and recovering the maleic acid from the reaction product.

4. The process for preparing maleic acid which comprises contacting a vapor mixture of air in excess of that necessary for complete combustion and a member of the group consisting of butylene, butadiene, and substances from which butylenes are readily generated, with an oxidation catalyst containing as essential ingredients tin vanadate, molybdenum oxide and titanium oxide, at a temperature of about 250° C. to about 400° C., and recovering the maleic acid from the reaction product.

5. The process for preparing maleic acid which comprises contacting a vapor mixture of air in excess of that necessary for complete combustion and butylene, with an oxidation catalyst containing tin vanadate, molybdenum oxide and titanium oxide at a temperature of about 250° C. to about 400° C., and recovering the maleic acid from the reaction product.

6. The process for preparing maleic acid which comprises contacting a vapor mixture of air in excess of that necessary for complete combustion and butadiene, with an oxidation catalyst containing tin vanadate, molybdenum oxide and titanium oxide at a temperature of about 250° C. to about 400° C., and recovering the maleic acid from the reaction product.

7. The process for preparing maleic acid which comprises contacting a vapor mixture of air in excess of that necessary for complete combustion and substances from which butylenes are readily generated, with an oxidation catalyst containing tin vanadate, molybdenum oxide and titanium oxide at a temperature of about 250° C. to about 400° C., and recovering the maleic acid from the reaction product.

8. The process for preparing maleic acid which comprises bringing a vapor mixture of a member of the group consisting of butylene, butadiene, and substances from which butylenes are readily generated, and a free-oxygen-containing gas in excess of that necessary for complete combustion, in contact with an oxidation catalyst containing vanadium, at a temperature sufficient to form maleic acid, and recovering the maleic acid from the reaction product.

9. The process for preparing maleic acid which comprises bringing a vapor mixture of one of the group consisting of butylene, butadiene, and substances from which butylenes are readily generated, and air in excess of that needed for complete combustion, in contact with an oxidation catalyst containing a vanadate in addition to one of the group consisting of titanium oxide and molybdenum oxide, at a temperature of about 250° C. to about 400° C., and recovering the maleic acid from the reaction product.

10. The process for preparing maleic acid which comprises bringing a vapor mixture comprising butylene, and air in excess of that necessary for complete combustion of the butylene, in contact with an oxidation catalyst containing vanadium, at a temperature of about 250° C. to about 400° C., and recovering the maleic acid from the reaction product.

CLYDE H. WALTERS.